(12) United States Patent
Lundgren

(10) Patent No.: US 10,517,213 B2
(45) Date of Patent: Dec. 31, 2019

(54) ASSIST DEVICE FOR LAWN MOWER AND METHOD OF USE

(71) Applicant: Ken Lundgren, Minneapolis, MN (US)

(72) Inventor: Ken Lundgren, Minneapolis, MN (US)

(*) Notice: Subject to any disclaimer, the term of this patent is extended or adjusted under 35 U.S.C. 154(b) by 0 days.

(21) Appl. No.: 15/467,962

(22) Filed: Mar. 23, 2017

(65) Prior Publication Data
US 2019/0246560 A1 Aug. 15, 2019

Related U.S. Application Data

(63) Continuation-in-part of application No. 14/399,131, filed on Nov. 5, 2014, now abandoned.

(51) Int. Cl.
| | |
|---|---|
| *A01D 34/82* | (2006.01) |
| *A01D 34/00* | (2006.01) |
| *B60N 3/02* | (2006.01) |
| A01D 101/00 | (2006.01) |
| A01D 34/64 | (2006.01) |

(52) U.S. Cl.
CPC ......... *A01D 34/824* (2013.01); *A01D 34/001* (2013.01); *B60N 3/02* (2013.01); *A01D 34/64* (2013.01); *A01D 2101/00* (2013.01)

(58) Field of Classification Search
CPC ...... A01D 34/001; A01D 34/64; A01D 34/82; A01D 34/824; B60N 3/02; B60N 3/026

USPC ......................................... 296/1.02; 16/110.1
See application file for complete search history.

(56) References Cited

U.S. PATENT DOCUMENTS

| | | | | |
|---|---|---|---|---|
| 3,791,116 | A * | 2/1974 | Wykhuis | A01D 34/824 280/47.371 |
| 8,794,660 | B1 * | 8/2014 | Stover | A01D 34/64 280/727 |
| 2005/0066643 | A1 * | 3/2005 | Fukushima | A01D 34/006 56/16.7 |

* cited by examiner

*Primary Examiner* — Jason S Daniels

(57) ABSTRACT

A grab bar and method for using the grab bar for exiting a zero turn lawn mower or adjusting a cutting deck height of the zero turn lawn mower having an operator deck and an operator seat proximate the operator deck, wherein the grab bar is attached to and extends upwardly from the deck forward of the operator seat, and includes a hand hold section for gripping to aid an operator in reaching a standing position on the operator deck. The device is secured to a top surface of the zero turn mower, wherein a base of the grab bar is adapted for connection with an angled surface such that the grab bar remains in an upright position allowing the operator to grip the grab bar along the hand hold section to assist the operator in positioning on, entering or exiting the mower.

18 Claims, 5 Drawing Sheets

ASSIST DEVICE FOR LAWN MOWER AND METHOD OF USE

RELATED APPLICATIONS

This application is a Continuation in Part of U.S. Ser. No. 14/399,131 filed on Nov. 5, 2014, which was in turn a Section 371 National Stage Application of International Application: No. PCT/US2014/055417, filed Sep. 12, 2014, all of which claim priority to and benefits of U.S. provisional, patent application Ser. No. 61/876,937, filed Sep. 12, 2013, the contents of which are incorporated herein by reference in their entirety.

BACKGROUND OF THE INVENTION

1. Field of the Invention

The present invention relates generally to assist devices for use with outdoor power equipment and, more particularly, to a device that can be affixed to any variety of riding lawn mowers that provides an aid to assists a user with getting on and off of the mower and for providing stability while sitting on the mower during operation.

2. Description of the Related Art

Those individuals that have certain physical impairments, or even those that may lose balance and experienced deceased flexibility or motor dexterity with increasing age, may find that working outdoors becomes more of a challenge. One activity in particular, lawn care, can be made easier with the use of lawn tractors or riding lawn mowers.

Garden tractors often have a user sit behind an engine and over top of a mower deck behind a steering wheel. Such a configuration can become difficult to ascend and descend for many. Therefore, one option is the use of a "zero-turn" lawn mower.

A zero turn lawn mower is a standard riding lawn mower with a turning radius that is effectively zero. These types of lawn mowers are larger than a standard mower and have a seat generally positioned above a cutting deck such that an operator must step on top of a floor positioned above the cutting deck to sit in the operator's chair to drive and operate the mower. The generally flat surface of the floor above the cutting deck allows the operator to enter and exit the lawn mower and provides access to the seat. When sitting in the seat, which is generally low to the ground, it may difficult to maneuver from seated to standing position or standing to seated position.

In the prior art, the only devices than an operator may have used for increased stability in exiting and entering the floor include the actual steering and/or drive controlling components, which are generally of an insufficient height to adequately aid the operator and may be inadvertently activated causing the mower to lurch or unexpectedly move if used as an assist device by the operator for exiting or entering the mower.

Some methods and devices are known that incorporate various mechanisms for providing enhanced stability on such outdoor power equipment. One particular example includes U.S. Pat. No. 8,794,660, issued in the name of Stover.

U.S. Pat. No. 8,794,660 issued in the name of Stover discloses a ride-on vehicle with operator assist bar that includes an assist handle for assisting an operator with climbing on to, or off of, a ground maintenance vehicle such as a mower, and a ground maintenance vehicle incorporating the same. The assist handle includes, in one embodiment, a grip portion movable between a deployed position, wherein the grip portion is positioned at a deployed elevation configured to assist the operator with ingress to, or egress from, a platform such as a seat; and a stowed position, wherein the grip portion is positioned at a stowed elevation lower than the deployed elevation.

Such a device may provide balance and support assistance, but exhibits a number of issues that may be of detriment to a user. By way of example, and not meant as a limitation: it is provided in conjunction with the equipment (specifically the ZTR mower design of The Toro Company®) and therefor not adaptable or movable to different styles, models and types of vehicle; it provides very little adjustability for customization for and comfort of the user; and it provides little in the way of ergonomic benefits for use alternately during mowing and mounting/dismounting of the vehicle.

Consequently, a need exist for an improved assist device for affixing to any variety of riding lawn mowers that provides an aid to assists a user with getting on and off of the mower and for providing stability while sitting on the mower during operation.

SUMMARY OF THE INVENTION

It is thus an object of the present invention to provide an assist device that can adjust for attachment to and use with different styles, models and types of mower vehicles.

It is another object of the present invention to provide such a device that is adjustable for attachment or use for customization for and comfort of the user.

It is a further object of the present invention to provide a bi-anglular support element that provides ergonomic benefits for use alternately during mowing and mounting/dismounting of the vehicle.

Briefly describe according to the preferred embodiment of the present invention, and improved assist device for a zero turn lawn mower is provided. The lawn mower assist device is made for attachment to the lawn mower and comprises an upwardly extending handle secured to a top, generally inclined (angled) facing surface of a riding lawn mower. The base of the handle is typically adapted for connection with any number of angled surfaces of different styles of lawn mower such that the handle remains in a generally upright, positionable orientation for an operator to grip. Gripping assistance of a bi-angular gripping end of the handle assists the operator in positioning during operation of the mower, or in ascending or exiting the mower.

The present invention also relates to a method of exiting a zero turn lawn mower using an assist device. The method of exiting a zero turn lawn mower having an operator deck and an operator seat proximate the operator deck comprises providing an assist device that extends upwardly from the deck and transitions in a bi-angular fashion to a horizontal terminus. The handle is positioned forward of the operator seat and adjusted in location and angle for optimal comfort and access. The horizontal terminus has a hand hold section for providing a first gripping position and a transitional section for providing a second gripping position. The multiple gripping positions provide assistance in transitioning from a sitting position aid to a standing position aid for the operator deck and further comprises exiting the operator deck with the aid of the assist device.

The present invention also relates to a method of adjusting the height of a cutting deck of a zero turn lawn mower using an assist device. The method of adjusting the cutting deck of a zero turn lawn mower having an operator deck and an operator seat proximate the operator deck comprises providing an assist device that extends upwardly from the deck and is positioned proximate a foot pedal for adjusting the cutting deck and forward of the operator seat. The device has a hand hold section for gripping and the method further comprises gripping the hand hold section from a sitting or standing position while also depressing a deck adjustment foot pedal.

Further objects, features and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
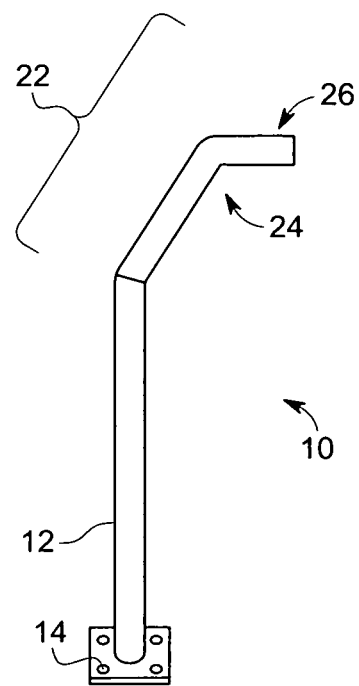
FIG. 1 is a side view of an assist device according to a first preferred embodiment of the present invention.
Figure 2:
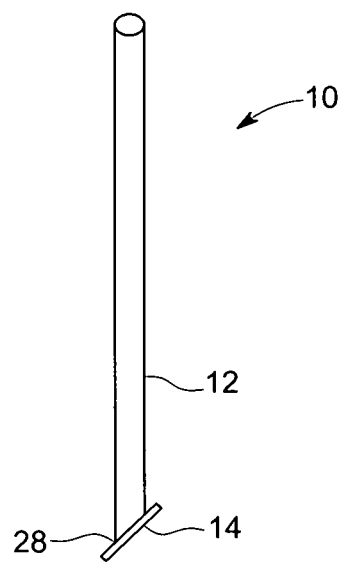
FIG. 2 is a front view thereof.
Figure 3:
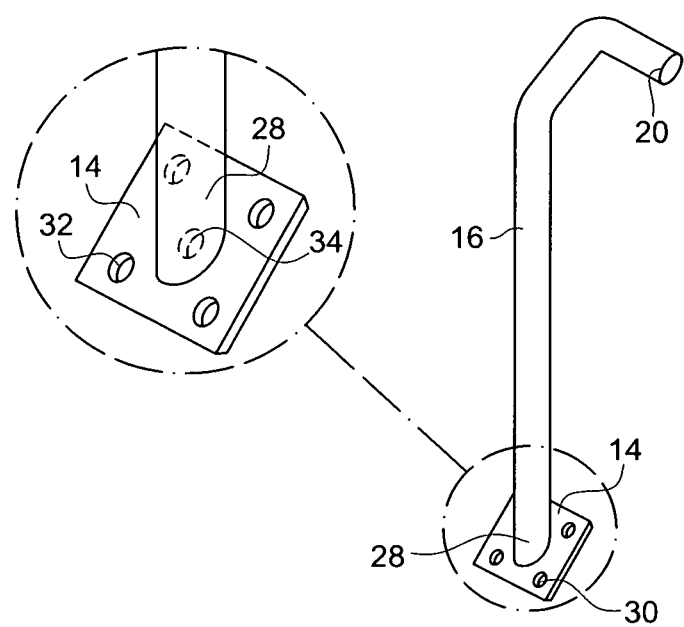
FIG. 3 is an exploded perspective view thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Referring now to FIG. 1-4, an assist device, generally noted as 12, is shown according to the first preferred embodiment of the present invention. The assist device 10 generally comprises an upright handle 12 terminated at a lower end by a connection plate 14, for connection to a top portion 36 of a riding lawnmower or zero turn lawnmower 16, proximate a seat for a user or an operator. As used throughout this description, the terms "user" and "operator" are interchangeable.

The handle 12 comprises a tube or bar, comprised of, for example, 14-gauge steel, aluminum, or any suitable material that maintains stability and structural integrity. The handle 12 is approximately 1.25 inches in diameter to provide for comfortable use with adult hands. The assist device 10 of this invention is generally to be used as an after-market device such that the device is sold as an attachment to be secured to any one of various zero-turn lawnmower makes or models. Moreover, the assist device can provide additional benefits to operators with health or physical issues that may otherwise prevent the operator from operating a riding lawn mower. The assist device assists operators who may become fatigued easily and also helps to reduce user bending when climbing onto or off of a mower equipped with the assist device. The device also provides stability for an operator when sitting or standing up from a seated position on the mower, or when adjusting cutting deck height while eliminating the need to use other components of the mower for stability that may not be able to withstand the operator's force or weight.

The handle 12 is adapted such that the handle 12 comprises a vertical portion of substantially straight and level length. The distal section 22 extends upwardly from connection with the mower floor approximately 19-20 inches for use with an average sized adult. Varying heights may be used depending on the size and height of the user. The distal section 22 terminates at a handle 26 that is formed as an upper and outer end of bi-angular handle that is adapted with a slight bend 24 or reasonable curvature along a portion such that a distal end section 26 of the handle 12 is substantially horizontally parallel with a mower surface. In one example, the distal section 22 is approximately eight (8) inches long wherein the distal end section 26 is approximately 2.8-3 inches long. The distal end section 26 is the portion which a user will grip or grab with their hand and in one embodiment is positioned generally horizontally. This end section 26 may also be foam covered, or a cushion-type material may be provided to surround the end section 26 for gripping to provide comfort when in use and to reduce slippage of the operator's hand.

The lower end of the section of the handle 12 proximate the base 14 is adapted with a modified end portion 28. The end portion 28 is essentially cut at a fixed angle, shown herein as an approximately 45-degree angle. This modified end is adapted for connection to the connection plate 14. The modified end portion 28 may be cut to any angle for attachment to various angled or slanted top surface sections of the mower as the assist device is mounted forward of the seat and the operator of the mower and may be offset to one side for ease of use and to avoid being a hindrance in operating the mower.

The connection plate 14 comprises a steel or aluminum plate. In the embodiment illustrated in the figures, the connection plate 14 measures approximately 3.25 inches on each side. The plate is adapted with five apertures. Four of the apertures 30 are positioned equally around the plate and adapted for insertion of a suitable fastener 32. The fifth aperture 34 is centered in the connection plate 14 at the point of connection to modified end portion 28 of the handle 12. The fasteners 32 may be a nut and bolt or any other suitable type of stable but removable fastener. The connection plate 14 is secured integrally to the modified end portion 28 of the handle 12. The connection plate 14 may be secured by welding the plate 14 to the end portion 28.

In the embodiment illustrated FIG. 1-4, the connection plate 14 is secured to the handle at the modified end portion 28 and at an angle approximately 45 degrees. Thus, the plate is retained at an angle while the handle remains substantially vertical when extending from its connection with the zero-turn lawn mower.

The plate 14 is secured to a front, top surface 36 of a floor of the lawn mower 16. The position for securing the handle is selected such that the handle is within reach of a user as the user sits down or stands up with respect to the seat. Preferably, the handle is also positioned on the top of the floor of the lawn mower off to one side. The handle is thus generally at the height of an adult's outstretched arm while the adult is seated. As the area for securing the handle is generally within an arm's reach of the adult while seated on the mower, the handle is generally secured proximate the front wheels of the mower.

This area is generally in a forward position on the top of the floor of the lawn mower 16. This area may include an angled section extending laterally across the front of the floor of the mower or may be a section of iron welded to the floor at an angle and extending laterally for extra support and stability for the lawn mower. This area also provides an angled surface for attachment of the assist device 12. As such, the connection plate is secured via fasteners to the angled surface 36. The connection plate 14 is secured substantially flush with the angled surface 36 of mower 16, the plate and the surface both being at an angle. This allows the handle to extend upwardly from the mower in a substantially vertical configuration. The distal end section 26 of the handle, bent as described previously, turns inward toward the center of the lawnmower and substantially parallel to a front edge of the seat, such that it is easy for a seated user to comfortably grip the end portion 28 of the handle. The handle thus allows the user to be assisted when getting out of the seated position as well as assisting a user in getting onto the floor of the mower itself. The handle also provides stability to a user when the user is adjusting the cutting deck 18 of the mower 16, which is under the floor and seat.

The device 12 can be secured at any position along the lateral surface 36. For example, the off-set position of the device may be adjusted based on the side from which an operator steps onto the floor of the mower, or depending on the hand dominance of the user. The device 12 can also be secured to the surface 26 proximate a foot pedal for adjusting the height of the lawnmower cutting deck 18. The height of the deck is generally adjusted manually by the operator. The operator would depress a foot pedal, the pressure and distance of the depress determining the extent of the raising of the cutting deck or whether the deck will be lowered. The cutting deck includes a housing and blade that are made of metal and therefore the cutting deck is heavy and requires some force to raise and lower the cutting deck. The handle 12 positioned near this foot pedal allows the operator to grip the handle for stability and leverage while depressing the foot pedal and adjusting the height of the cutting deck 18.

Figure 4:
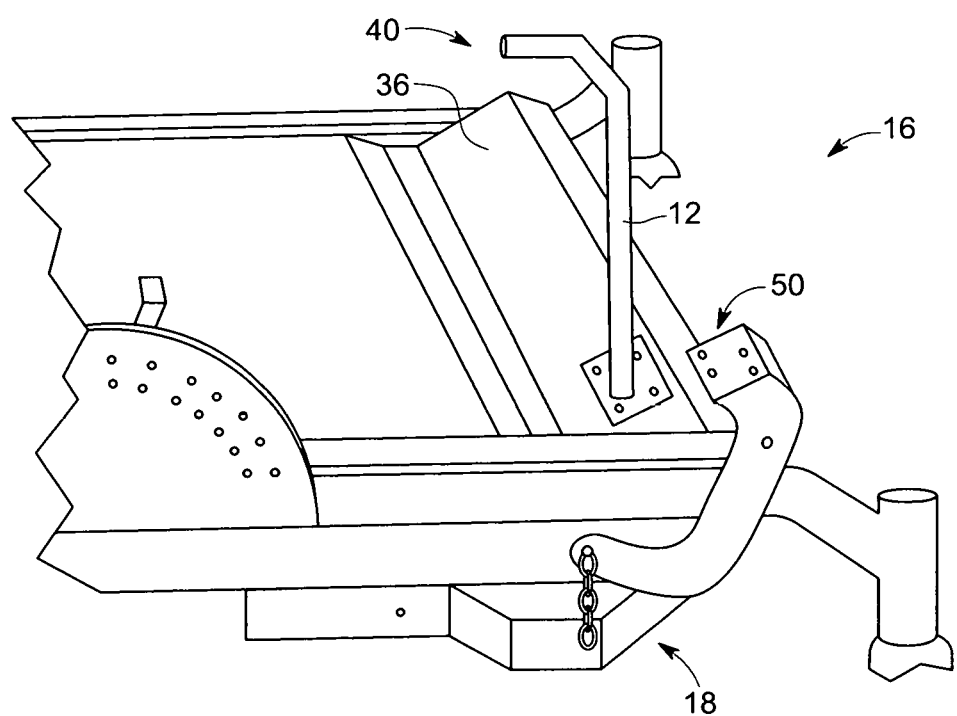
FIG. 4 is a perspective view of an assist device installed for use.
Figure 5:
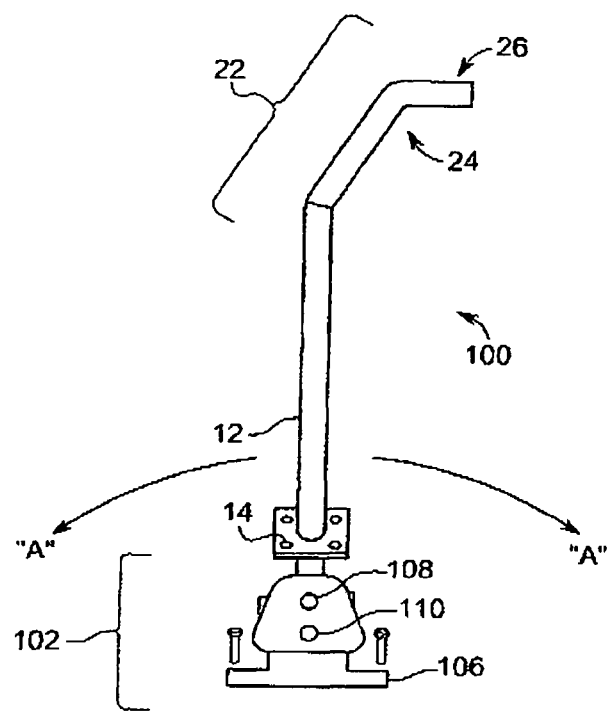
FIG. 5 is a side view of an assist device according to a second preferred embodiment of the present invention.
Figure 6:
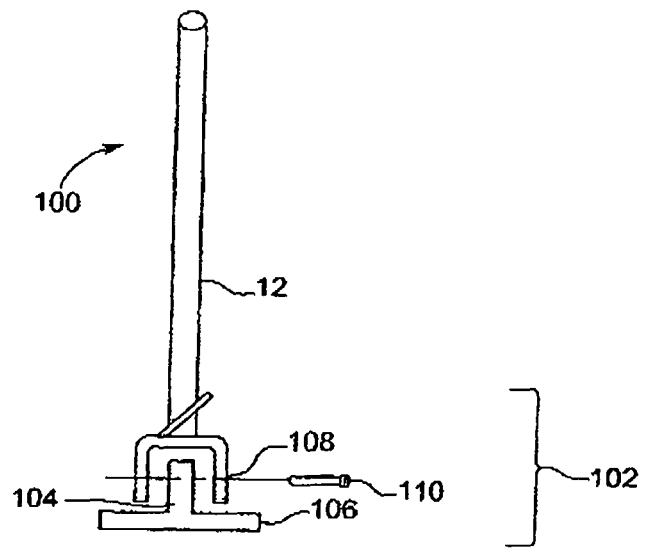
FIG. 6 is a front view thereof.
Figure 7:
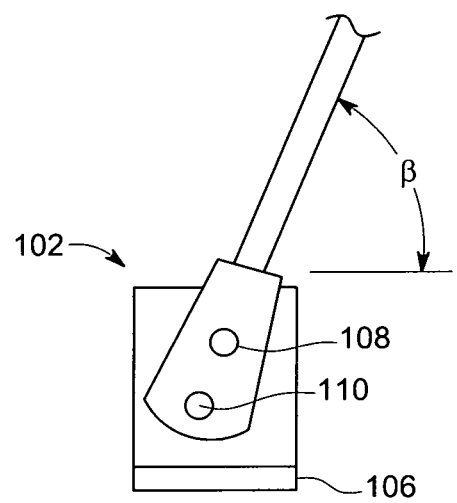
FIG. 7 is an exploded perspective view thereof.
Figure 8:
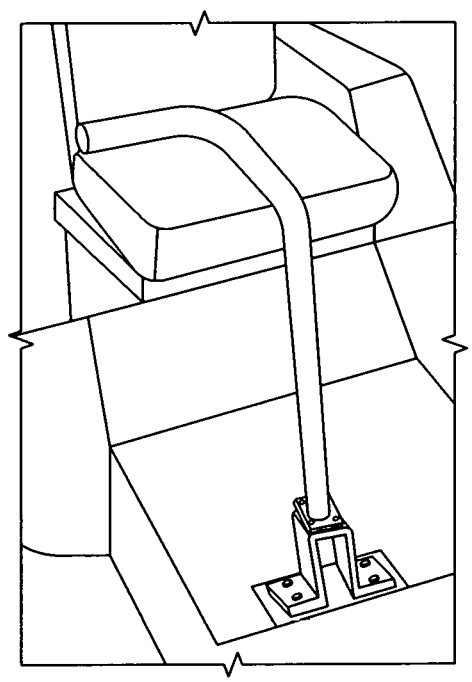
FIG. 8 is a perspective view of an assist device installed for use.

As illustrated in FIG. 4, arrows 40 and 50 are used to demonstrate the method of using the handle. Arrow 40 generally represents the direction of the operator grip when using the handle in moving from a seated position to a standing position, standing position to seated position, or when adjusting the height of the cutting deck 18. Arrow 50 generally represents the direction in which the operator may apply force to the foot pedal for adjusting the cutting deck height when also gripping the handle.

Referring now to FIG. 5-8, an assist device, generally noted as 100, is further shown according to a second preferred embodiment of the present invention according to the first preferred embodiment of the present invention. The assist device 100 generally comprises an upright handle 12 of a similar design, style and construction as with the preferred embodiment shown and described herein above. In the alternate embodiment, the assist device 100 terminates at a lower end by a connection joint 102 that provides for a pivotal adjustment along one arc or plane A-A. The connection joint 102 provides an attachment pedestal 104 perpendicularly affixed to a lower connection plate 106 for connection to a top portion of a riding lawnmower or zero turn lawnmower 16, proximate a seat for a user or an operator. A rotating pivot point 108 provides an axle upon and about which the upright handle 12 may pivot. Pivoting is accomplished to adjust the angle 'β' between a plane of the lower connection plate 106 and a plane of the handle 12 such as to provide for adjustment when used with various styles and designs of mowers or a various parts of the deck. The angle 'β' may be fixed by insertion of a hitch pin 110 or other type of fastener to lock the handle 12 to the connection joint 102.

2. Operation of the Preferred Embodiment

In operation, the present invention may be affixed to any of a number of types of mowers or outdoor power equipment or other vehicle. Positioning of the device on the mower as described previously throughout this disclosure further allows the user to take advantage of additional leverage, especially when exiting the mower or rising from a seated position. The device can also be used for stability when sitting in the seat.

Although the present invention has been described with reference to preferred embodiments, workers skilled in the art will recognize that changes may be made in fonmand detail without departing from the spirit and scope of the invention, as well as in its function and intended use. While the present device is described and intended for use with outdoor power equipment such as zero turn or other types of riding lawn mowers, it is envisioned that various other applications, may arise or become apparent that may be facilitated with a similar or equivalent application of the present invention. By way of example, and not meant as a limitation, one such envisioned application may be for use with boating in which a user may wish to embark or debark a vessel with the application of such a similar devise affixed to a deck or at a dock.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 U.S. 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A grab handle for interchangeable attachment to zero turn lawnmowers, the grab handle comprising:
   a connection joint for securing to a deck of a zero turn mower; and
   an upwardly extending handle, pivotally affixed at a lower end to said connection joint,
   wherein the connection joint is adapted for connection with an angled surface of a deck of the zero turn mower such that the upwardly extending handle may be positioned to a generally upright position for an operator to grip the upwardly extending handle to assist the operator in mounting and dismounting the zero turn mower.

2. The grab handle of claim 1, wherein the upwardly extending handle further comprises;
   an upwardly extending base section; and
   a grip section at an upper end, the grip section extending approximately transverse to the base section.

3. The grab handle of claim 2, wherein the grip section further includes a cushion extending around the grip section.

4. The grab handle of claim 3, wherein the grip section further comprises a bi-angular support element.

5. The grab handle of claim 4, wherein the bi-angular support element further comprises;
   a generally horizontally disposed terminal end; and
   a generally angular transitional section located between the terminal end and the upwardly extending base section.

6. The grab handle of claim 5, wherein the horizontally disposed terminal end is positioned parallel with a horizontal centerline of the zero turn mower.

7. The grab handle of claim 2, wherein the grip section further comprises a bi-angular support element.

8. The grab handle of claim 7, wherein the bi-angular support element further comprises;
   a generally horizontally disposed terminal end; and
   a generally angular transitional section located between the terminal end and the upwardly extending base section.

9. The grab handle of claim 8, wherein the horizontally disposed terminal end is positioned parallel with a horizontal centerline of the zero turn mower.

10. A grab handle for attachment to a zero turn mower, comprising:
    an upwardly extending handle having an upper end and a lower end; and
    a connection joint comprising;
    a lower connection plate for attachment to a deck of the zero turn mower; and
    an attachment pedestal, perpendicularly affixed to the lower connection plate,
       wherein the lower end of the handle is rotatably attached to the attachment pedestal to allow rotationally adjustable movement of the upwardly extending handle to the connection joint, such that an operator may adjust the upwardly extending handle to suit the operator's use requirements.

11. The grab handle of claim 10, wherein pivoting of the upwardly extending handle with respect to the connection joint allows the operator to adjust an angle between a plane of the lower connection plate when attached to the deck, and a plane of the upwardly extending handle to assist in mounting and dismounting the zero turn mower.

12. The grab handle of claim 11, further comprising:
    pedestal apertures formed in the attachment pedestal;
    handle apertures formed in the lower end of the upwardly extending handle; and
    a fastener insertable through a pedestal aperture and an attachment aperture when aligned to lock the upwardly extending handle in positon.

13. The grab handle of claim 12, wherein the upper end of the upwardly extending handle comprises a grip section including a bi-angular support element.

14. The grab handle of claim 13, wherein the bi-angular support element further comprises;
    a generally horizontally disposed terminal end; and
    a generally angular transitional section located between the terminal end and the lower end of the upwardly extending handle.

15. The grab handle of claim 14, wherein the horizontally disposed terminal end is positioned parallel with a horizontal centerline of the zero turn mower.

16. A method of providing a grab handle for mounting and dismounting a zero turn mower, the method comprising:
    mounting a connection joint to a deck of the zero turn mower, the connection joint adapted to attach to an angled surface of the deck;
    pivotally attaching a lower end of an upwardly extending handle to the connection joint such that the upwardly extending handle may be positioned to a generally upright position for an operator to use in mounting and dismounting the zero turn mower.

17. The method of claim 16, wherein the upwardly extending handle further comprises an upper end with a grip section, the grip section comprising:
    a bi-angular support element, wherein the bi-angular support element further comprises;
    a generally horizontally disposed terminal end; and
    a generally angular transitional section located between the terminal end and the lower end of the upwardly extending handle.

18. The method of claim 17, wherein the horizontally disposed terminal end is positioned parallel with a horizontal centerline of the zero turn mower.

* * * * *